United States Patent [19]

Scott

[11] Patent Number: 5,605,000
[45] Date of Patent: Feb. 25, 1997

[54] SCHEDULING BOARD

[76] Inventor: Sylvia M. Scott, 1637 Westway Dr., Charleston, S.C. 29412

[21] Appl. No.: 393,085

[22] Filed: Feb. 22, 1995

[51] Int. Cl.⁶ .................................................. G09D 3/00
[52] U.S. Cl. ............................... 40/107; 116/325; 283/2; 40/110
[58] Field of Search ............................. 40/657, 622, 110, 40/107; 116/325, 326; 283/2, 900; 434/430

[56] References Cited

U.S. PATENT DOCUMENTS

| | | | |
|---|---|---|---|
| 369,945 | 9/1887 | Jayne | 283/2 |
| 1,266,426 | 5/1918 | De Tullio | 116/325 |
| 1,895,322 | 1/1933 | Hall | 40/107 |
| 2,183,183 | 12/1939 | Burk | 116/325 X |
| 2,509,659 | 5/1950 | Wassell | 116/325 |
| 3,645,227 | 2/1972 | Lahmer | 116/325 |
| 4,148,273 | 4/1979 | Hollingsworth et al. | 116/325 |
| 4,282,824 | 8/1981 | Lafferty | 40/657 X |
| 4,815,767 | 3/1989 | Lambert | 434/430 X |
| 5,387,011 | 2/1995 | Freund | 434/430 X |

FOREIGN PATENT DOCUMENTS 2212444  7/1989  United Kingdom ...................... 283/2

Primary Examiner—Brian K. Green
Attorney, Agent, or Firm—B. Craig Killough

[57] ABSTRACT

A scheduling board having a multiplicity of horizontal designations and a series of vertical designations allows the placement of markers at the intersections of the designations to indicate a job or functions which is scheduled, for example, at a particular time. The board allows three or more designation variables, such as day, time and function, to be coordinated by means of the board. The board is highly visible and accessible for operators and users.

4 Claims, 1 Drawing Sheet

SCHEDULING BOARD

FIELD OF THE INVENTION

The present invention is a scheduling board.

BACKGROUND OF THE INVENTION

Numerous devices are available for scheduling and for tracking appointments. These devices incorporate a wide range of complexity of use, and a wide range of information provided. Scheduling devices range from simple calendars to complex computer software.

The prior art has included scheduling boards and appointment boards. These terms are used interchangeably herein. The advantage of the use of a board is that it may be positioned or hung on a wall. Such positioning makes the appointment board easily visible. However, it is not necessary that an appointment board be positioned on a wall. The appointment board may be positioned on a horizontal surface, such as a table top.

Informational boards of the prior art as used for writing or other wise indicating various information, including information regarding scheduling, on the board. Some the boards of the prior art use marker devices to provide information.

SUMMARY OF THE PRESENT INVENTION

The present invention provides a scheduling board which coordinates one or more variables. The board may be hung on a wall, so that it is easily seen, and so that access to the board is quick and efficient.

The board of the present invention has a first multiplicity of designations which run horizontally across the board, and a second multiplicity of designations which run vertically along the board. An imaginary grid results from the intersections of the first and second multiplicity of designations. Markers are placed at the points of intersection of the selected designations to indicate that, for example, the particular time and date, have been scheduled for a function to be performed.

The use of markers of different colors allows a third set of information variables to be introduced. For example, a marker of a particular color indicates that a particular job is to be performed at the time and date indicated by the intersection of the time and date. Markers having an additional difference in appearance, such as shape, allows a fourth information variable to be introduced.

The present invention provides areas for positioning markers when not in use. The invention also allows particular information pertaining to the designations to be indicated.

DETAILED DESCRIPTION OF THE DRAWINGS

Figure 1:
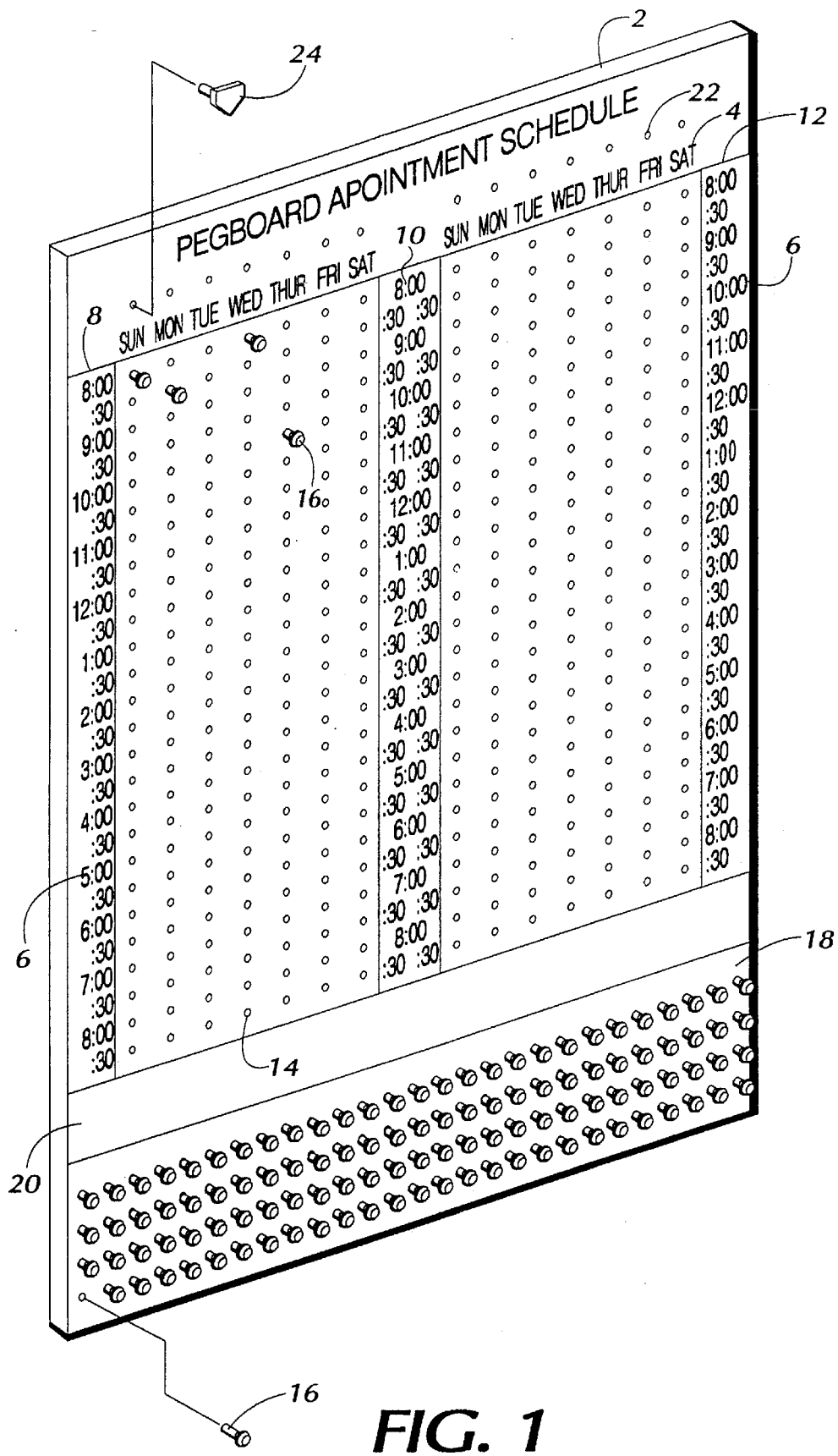

FIG. 1 is a perspective view of the appointment board, showing the device used as an appointment scheduler.

DETAILED DESCRIPTION OF THE PREFERRED EMBODIMENT

Referring now to the drawing figures, FIG. 1 shows the appointment board 2 in a peg board style. A multiplicity of horizontal designations 4 appears near a top edge of the board. In the embodiment shown in FIG. 1, the horizontal designations correspond to days of the week, and more particularly, the days are shown, with the designations broken into series, with each series having seven days. More days, or fewer days, could be designated. Designations other than days of the week could be used according to the information desired.

A multiplicity of vertical designations 6 is positioned along the board. As shown in FIG. 1, the vertical designations correspond to times of day. The times of day shown are from 8:00 a.m. through 8:30 p.m., with the time broken into half hour segments. Other segments, or frequencies, could be used. A longer or shorter period of time could be used. Designations other than time of day could be used, as long as the variables indicated by the vertical designations correspond to, or are functions of, the variables indicated by the horizontal designations.

The information of the designations may be reproduced more than one time on the board. As shown in FIG. 1, a first 8, second 10, and third 12 column, of vertical designations are presented. This reproduction facilitates location of the intersection of the horizontal and vertical designations.

A grid is formed at the point of intersection of the horizontal designations and the vertical designations. The grid is not explicitly shown in the drawing figure, and is imaginary, although it could be shown on the physical embodiment of the invention if desired. These points of intersection are capable of receiving a marker,, and are called marker receivers 14. As shown in FIG. 1, a hole, an aperture, an or void is created in the board into which a marker may be inserted to form the marker receiver. In this embodiment, the marker 16 is a peg which is inserted into the hole or void formed at the intersection of the selected horizontal designation and the selected vertical designation. Markers other than pegs may be used, for example, the markers may be magnetic. The marker receiver could be a magnet or ferrous material which would attach the magnetic marker. Other forms of markers and marker receivers could be used. It is desirable that the marker be capable of selective attachment and removal from the marker receiver to optimize the reusability of the board.

In the preferred embodiment, the markers are of more than one series. Each series of marker has a different appearance. For example, one hundred markers could be provided. The markers may be broken into series of several markers each, with each marker series having a different color. Each color series corresponds to a function to be performed. In this manner, when a particular color is inserted into a particular marker receiver, an indication is made that a particular function or job is to be performed at a particular time on a particular day of the week. The number of markers provided in each series is determined by the frequency of performance of a particular function. While it is preferred that each series have a different color, since quick visual recognition is a goal of the present invention, other differences in the markers, such as shape, or a letter or number on the marker, could be used to differentiate the markers. Likewise, the markers could be different in both color and shape or other designation, so that additional variables to be scheduled may be introduced into the system.

A reserve area 18 for markers not in use is provided. This reserve area is remote from the marker receivers which correspond to the horizontal and vertical designations. A grid is positioned adjacent to the reserve area. The indicator grid 20 has a series of sections. Each section may be of a different color, or have other information, which corresponds to the markers. The markers which are not in use are positioned within the reserve area, and are positioned adjacent to and corresponding with the appropriate section of the indicator grid which, in turn, corresponds to the color or type of marker. The reserve area may be provided with marker receivers, such as holes or voids, for markers.

An additional multiplicity of marker receivers may be provided. This additional set of marker receivers may form a linear array corresponding to one of the multiplicity of designations. As shown in FIG. 1, a generally linear array is formed by a multiplicity of marker receivers 22 with each marker receiver corresponding to the horizontal designations, or days of the week. A similar linear array may be positioned vertically to correspond to the time, or other information presented in the multiplicity of vertical designations. A marker 24 is provided to indicate the current day of the week in the example.

In use, the appointment boards quickly and easily allows scheduling of appointments. The appointments, as scheduled, are easily referenced. It is not necessary to use pens, markers, keyboards of other devices to place indications upon the appointment board.

By way of demonstration of the preferred embodiment, if a particular function is to be performed at 10:00 a.m. on Thursday of the current week, a marker 16 corresponding to that function is inserted at the marker receiver which corresponds to the intersection of Thursday at 10:00. The operator may insert additional markers corresponding to the function if the function takes in excess of thirty minutes. If the appointment board is used in the setting a of hair styling salon, a hair cut could be scheduled by inserting, for example, a blue marker at the appropriate time and date. A permanent, which takes longer than a haircut, could be inserted at the appropriate time and date by using, for example, a red marker. Other functions to be performed could similarly be designated by markers having other colors or other appearances at the appropriate time and date. The board thereby lets the operator schedule his or her appointments, and quickly refer to the schedule by quickly at the appointment board.

What is claimed is:

1. A scheduling board, comprising:
   a. a board;
   b. a multiplicity of vertical indicia designations positioned vertically across said board;
   c. a multiplicity of horizontal indicia designations positioned horizontally along said board;
   d. a multiplicity of apertures, with each of said apertures corresponding to one of said vertical designations and to one of said horizontal designations;
   e. a multiplicity of series of pegs, with each series of pegs differing in color from each remaining series of pegs, and wherein each of said pegs is capable of selective attachment to any one of said multiplicity of apertures,
   f. a second multiplicity of apertures which are arranged to form a generally linear array, wherein each of said apertures of said second multiplicity of marker receivers is positioned adjacent to and above said horizontal designations; and
   g. an indicator grid which is positioned on said board, wherein said indicator grid has a series of sections, wherein each section is of a different color, and wherein each section corresponds in color to one of said series of pegs.

2. A scheduling board as described in claim 1, further comprising a marker reserve area, wherein said marker reserve area is located on an area of said board which is remote from an area on which said first multiplicity of marker receivers are located, and wherein marker receivers of said marker reserve area do not correspond to said horizontal designations or to said vertical designations.

3. A scheduling board, comprising:
   a. a board;
   b. a multiplicity of vertical designations positioned vertically across said board, with each of said designations corresponding to a different hour of the day;
   c. a multiplicity of horizontal designations positioned horizontally along said board, with each of said designations corresponding to a day of the week;
   d. a multiplicity of marker receivers, with each of said marker receivers corresponding to one of said vertical designations and to one of said horizontal designations;
   e. a multiplicity of series of markers, with each series of markers differing in appearance from each remaining series of markers, and wherein each of said markers is capable of selective attachment to any one of said multiplicity of marker receivers;
   f. a second multiplicity of marker receivers which are arranged to form a generally linear array, wherein each of said marker receivers of said second multiplicity of marker receivers is positioned adjacent to one of said horizontal designations;
   g. a marker reserve area, wherein said marker reserve area is located on an area of said board which is remote from an area on which said first multiplicity of marker receivers are located, and wherein marker receivers of said marker reserve area do not correspond to said horizontal designations or to said vertical designations; and
   h. an indicator grid which is positioned adjacent to said marker reserve area, wherein said indicator grid has a series of sections, wherein each section is of a different color, and wherein each section corresponds to one of said series of markers.

4. A scheduling board, comprising:
   a. a board;
   b. a multiplicity of vertical indicia designations positioned vertically across said board;
   c. a multiplicity of horizontal indicia designations positioned horizontally along said board;
   d. a multiplicity of aperture, with each of said apertures corresponding to one of said vertical designations and to one of said horizontal designations;
   e. a multiplicity of series of pegs, with each series of pegs differing in appearance from each remaining series of pegs, and wherein each of said pegs is capable of selective attachment to any one of said multiplicity of apertures;
   f. a second multiplicity of apertures which are arranged to form a generally linear array, wherein each of said apertures of said second multiplicity of apertures is positioned adjacent to and above said horizontal designations; and
   g. an indicator grid which is positioned on said board, wherein said indicator grid has a series of sections, with each section differing in appearance from every other section, and with each section corresponding to one of said series of pegs.

* * * * *